United States Patent
Saito (10) Patent No.: US 6,948,101 B2
(45) Date of Patent: Sep. 20, 2005

(54) APPARATUS AND METHOD FOR MANAGING A NETWORK, AND PROGRAM THEREOF

(75) Inventor: Sohya Saito, Tokyo (JP)

(73) Assignee: Allied Telesis K.K., Tokyo (JP)

( * ) Notice: Subject to any disclaimer, the term of this patent is extended or adjusted under 35 U.S.C. 154(b) by 481 days.

(21) Appl. No.: 10/064,386

(22) Filed: Jul. 9, 2002

(65) Prior Publication Data

US 2003/0120969 A1 Jun. 26, 2003

Related U.S. Application Data

(63) Continuation of application No. PCT/JP01/11164, filed on Dec. 20, 2001.

(51) Int. Cl.$^7$ .............................................. G06F 11/00
(52) U.S. Cl. .............................. 714/43; 370/216; 714/4
(58) Field of Search .............................. 714/48, 30, 31, 714/43, 4, 26; 370/401, 402, 216, 226

(56) References Cited

U.S. PATENT DOCUMENTS

| | | | | |
|---|---|---|---|---|
| 4,451,916 A | * | 5/1984 | Casper et al. .................. 714/4 |
| 4,899,142 A | * | 2/1990 | Nakayashiki et al. ........ 370/224 |
| 5,539,877 A | * | 7/1996 | Winokur et al. .............. 714/26 |
| 5,825,515 A | * | 10/1998 | Anderson ..................... 398/10 |
| 5,917,831 A | * | 6/1999 | Katker et al. ................ 714/712 |
| 6,810,496 B1 | * | 10/2004 | Vittal .......................... 714/57 |

FOREIGN PATENT DOCUMENTS

| JP | 08-265317 A1 | 10/1996 |
|---|---|---|
| JP | 2001-358744 A1 | 12/2001 |

OTHER PUBLICATIONS

"Center COM MBM01 User's Manual", Rev. A. first ed., Allied Telesis, Oct. 2001, pp. v. 3–3, 3–4, 3–6, 3–14.

* cited by examiner

Primary Examiner—Robert Beausoliel
Assistant Examiner—Aaron Matthew
(74) Attorney, Agent, or Firm—Cooley Godward LLP (57) ABSTRACT

A network including a plurality of interconnecting devices, each of which interconnects communication between two transmission media and has a disconnect function for disconnecting communication to one transmission medium in a case where communication from the other transmission medium has been disconnected, is managed by storing interconnecting device information that identifies one or more of the interconnecting devices having a disconnection release function for releasing operation of the disconnect function. When a communication path formed by one or more of the interconnecting devices connected in series is disconnected, the interconnecting device information is used to determine which interconnecting devices in the communication path have the disconnection release function; an operation of each of the interconnecting devices in the communication path having the disconnection release function is sequentially controlled to acquire communication statuses of the interconnecting devices, and to diagnose a probable location of trouble in the interconnecting devices or the transmission media in the disconnected communication path; and the diagnosed probable location of trouble for the interconnecting devices or the transmission media is notified.

11 Claims, 9 Drawing Sheets

| ID | DEVICE | TYPE | DESTINATION ID |
|---|---|---|---|
| 001 | MANAGEMENT APPARATUS 150 | SERVER | 002-0 |
| 002 | INTERCONNECTING APPARATUS 110 | ROUTER | PORT 0:001 |
| 003 | INTERCONNECTING DEVICE 120a | INTERCONNECTING DEVICE M | PORT 0:002-1, PORT 1:004-0 |
| 004 | INTERCONNECTING DEVICE 120b | INTERCONNECTING DEVICE M | PORT 0:003-1, PORT 1:005 |
| 005 | TERMINAL 140a | CLIENT | 004-1 |
| 006 | INTERCONNECTING DEVICE 130a | INTERCONNECTING DEVICE | PORT 0:002-2, PORT 1:007-0 |
| 007 | INTERCONNECTING DEVICE 120c | INTERCONNECTING DEVICE M | PORT 0:006-1, PORT 1:008 |
| 008 | TERMINAL 140b | CLIENT | 007-1 |
| 009 | INTERCONNECTING DEVICE 130b | INTERCONNECTING DEVICE | PORT 0:002-3, PORT 1:010-0 |
| 010 | INTERCONNECTING DEVICE 130c | INTERCONNECTING DEVICE | PORT 0:009-1, PORT 1:011 |
| 011 | TERMINAL 140c | CLIENT | 010-1 |

| # | DATE AND TIME | TROUBLE SITE |
|---|---|---|
| 1 | 2000/10/29 17:05 | 003 |
| 2 | 2000/11/15 8:53 | 004-1~005 |
| | | |

APPARATUS AND METHOD FOR MANAGING A NETWORK, AND PROGRAM THEREOF

CROSS REFERENCE TO RELATED APPLICATIONS

This patent application is a continuation application of PCT/JP01/11164 filed on Dec. 20, 2001 and claims priority therefrom, the contents of which are incorporated herein by reference.

BACKGROUND OF INVENTION

1. Field of the Invention

The present invention relates to a management apparatus and a method for management of a network. The present invention also relates to a network management program and a recording medium storing the network management program.

2. Description of the Related Art

With recent widespread use of the Internet at home, for example, it is expected that a high-speed line capable of delivering a large amount of data, such as audio data, image data and movie data, via the Internet will be generally available. In order to satisfy these demands, FTTH (Fiber To The Home), in which optical fibers are provided to the home, and the like, are being made available widely to consumers.

Typically, at an office or the home, many media converters for performing media conversion between an optical fiber and a UTP (Unshielded Twisted Pair) cable are used in order to connect the optical fibers to interconnecting devices, such as routers, terminals and the like. In a building having a plurality of offices or apartments, repeaters are often used in order to extend the lines in the building. As described above, in a building having many offices or apartments, a network having a large number of interconnecting devices and containing many media converters and repeaters is formed.

Since such a network is commonly used by many companies or homes, it is desirable that the network be capable of being managed with reduced management work and lower management cost. Accordingly, there is a need for efficient and cost-effective management of dispersed networks having interconnecting devices, media converters, repeaters, and the like.

SUMMARY OF INVENTION

Therefore, it is an object of the present invention to provide a management apparatus, a network management method, a program and a recording medium storing a program, which are capable of overcoming the above drawbacks accompanying the conventional art. The above and other objects can be achieved by combinations described in the independent claims. The dependent claims define further advantageous and exemplary combinations of the present invention.

According to a first aspect of the present invention, a management apparatus is provided for managing a network, which includes a plurality of interconnecting devices that form one or more communication paths having one or more of the interconnecting devices connected in series with each of the interconnecting devices interconnecting communication between two transmission media and having a disconnect function for disconnecting communication to at least one of the transmission media in a case where communication from the other one of the transmission media has been disconnected. One or more of the plurality of interconnecting devices has a disconnection release function for releasing a disconnection operation by the disconnect function. The management apparatus includes an interconnecting-device information memory operable to store interconnecting device information for identifying which of the interconnecting devices have the disconnection release function; a processing unit operable to determine, in a case where the communication path has been disconnected, which of the one or more interconnecting devices in the disconnected communication path have the disconnection release function based on the interconnecting device information; a diagnosis unit operable to sequentially control the one or more interconnecting devices in the communication path, which have the disconnection release function, to acquire corresponding communication statuses of the interconnecting devices in the communication path, and to diagnose a probable location of trouble in the disconnected communication path; and a notifying unit operable to notify, based upon the probable location of trouble diagnosed by the diagnosis unit, which of the one or more interconnecting devices and the transmission media is the probable location of trouble.

The diagnosis unit may transmit, to each of the interconnecting devices in the communication path having the disconnection release function, a communication status get message for getting a communication status of each of the interconnecting devices, and determine the probable location of trouble by a reply message responding to the communication status get message from each of the interconnecting devices.

The interconnecting devices may include a first interconnecting device and a second interconnecting device, each having the disconnection release function and being connected in the communication path. The diagnosis unit may transmit the communication status get message to the first interconnecting device to acquire the communication status of the first interconnecting device, and, in a case where it is diagnosed that there is no trouble in communication between the management apparatus and the first interconnecting device, release an operation by the disconnect function of the first interconnecting device; transmit, via the first interconnecting device, the communication status get message to the second interconnecting device; and diagnose the probable location of trouble between the first interconnecting device and the second interconnecting device by using the reply message responding to the communication status get message.

A trouble recording unit may be provided to store trouble information identifying occurrences of trouble in the network. The diagnosis unit may determine, by the trouble information for a similar communication path having a configuration similar to the disconnected communication path, a degree of the probable location of trouble for each of the interconnecting devices in the disconnected communication path for which trouble in communication has yet not been determined.

The diagnosis unit may determine the degree of the probable location of trouble for each of the interconnecting devices in the disconnected communication path by the trouble information of a corresponding interconnecting device at a corresponding position in the similar communication path.

The notifying unit may be operable to display on a display of the management apparatus, for each of the plurality of interconnecting devices in the network, whether a probability of trouble is high or low or whether or not there is trouble so as to be visually recognized.

The diagnosis unit may determine, by the trouble information for a similar communication path having a configuration similar to the disconnected communication path, a degree of the probable location of trouble for each of the transmission media for which trouble in communication has yet not been determined. The diagnosis unit may determine the degree of the probable location of trouble for each of the transmission media by the trouble information of a corresponding transmission medium at a corresponding portion of the similar communication path. The notifying unit may be operable to display on a display of the management apparatus, for each of the transmission media in the network, whether a probability of trouble is high or low or whether or not there is trouble so as to be visually recognized.

A network management method is provided for managing a network having a plurality of interconnecting devices that form one or more communication paths by one or more of the interconnecting devices being connected in series. Each interconnecting device interconnects communication between two transmission media and has a disconnect function for disconnecting communication to at least one of the transmission media in a case where communication from the other one of the transmission media is disconnected. One or more of the plurality of interconnecting devices has a disconnection release function for releasing operation of the disconnect function. The method includes storing interconnecting device information for identifying which of the interconnecting devices have the disconnection release function; determining, when the communication path has been disconnected, which of the one or more interconnecting devices in the disconnected communication path has the disconnection release function by the interconnecting device information; sequentially controlling each of the interconnecting devices in the communication path having the disconnection release function to acquire communication statuses of the interconnecting devices in the communication path, and diagnosing a probable location of trouble in the interconnecting devices or the transmission media in the communication path; and notifying that the interconnecting devices or the transmission media have trouble based upon the probable location of trouble diagnosed for the interconnecting devices or the transmission media.

A program is provided for managing a network including a plurality of interconnecting devices forming one or more communication paths with one or more of the interconnecting devices connected in series. Each interconnecting device interconnects communication between two transmission media and has a disconnect function for disconnecting communication to at least one of the transmission media when communication from the other one of the transmission media has been disconnected. At least one of the plurality of interconnecting devices has a disconnection release function for releasing operation of the disconnect function. The program has a memory module operable for storing of interconnecting device information for identifying which of the interconnecting devices have the disconnection release function; a processing module operable for determining, when the communication path has been disconnected, which of the one or more interconnecting devices has the disconnection release function; a diagnosis module operable for sequentially controlling each of the interconnecting devices in the communication path having the disconnection release function to acquire communication statuses of the interconnecting devices, and for diagnosing a probable location of trouble in the interconnecting devices or the transmission media; and a notifying module operable for notifying that the interconnecting devices or the transmission media have trouble based upon the probable location of trouble diagnosed for the interconnecting devices or said transmission media by the diagnosis module.

A recording medium storing a program for managing a network is provided. The network includes a plurality of interconnecting devices forming one or more communication paths with one or more of the interconnecting devices connected in series. Each interconnecting device interconnects communication between two transmission media and has a disconnect function for disconnecting communication to at least one of the transmission media when communication from the other one of the transmission media has been disconnected. At least one of the plurality of interconnecting devices has a disconnection release function for releasing operation of the disconnect function. The program has a memory module operable for storing of interconnecting device information for identifying which of the interconnecting devices have the disconnection release function; a processing module operable for determining, when the communication path has been disconnected, which of the one or more interconnecting devices in the disconnected communication path has the disconnection release function; a diagnosis module operable for sequentially controlling each of the interconnecting devices in the communication path having the disconnection release function to acquire communication statuses of the interconnecting devices, and for diagnosing a probable location of trouble in the interconnecting devices or the transmission media; and a notifying module operable for notifying that the interconnecting devices or the transmission media have trouble based upon the probable location of trouble diagnosed for the interconnecting or said transmission media by the diagnosis module.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION

The invention will now be described based on the preferred embodiments, which do not intend to limit the scope of the present invention, but exemplify the invention. All of the features and the combinations thereof described in the embodiments are not necessarily essential to the invention.

Figure 1:
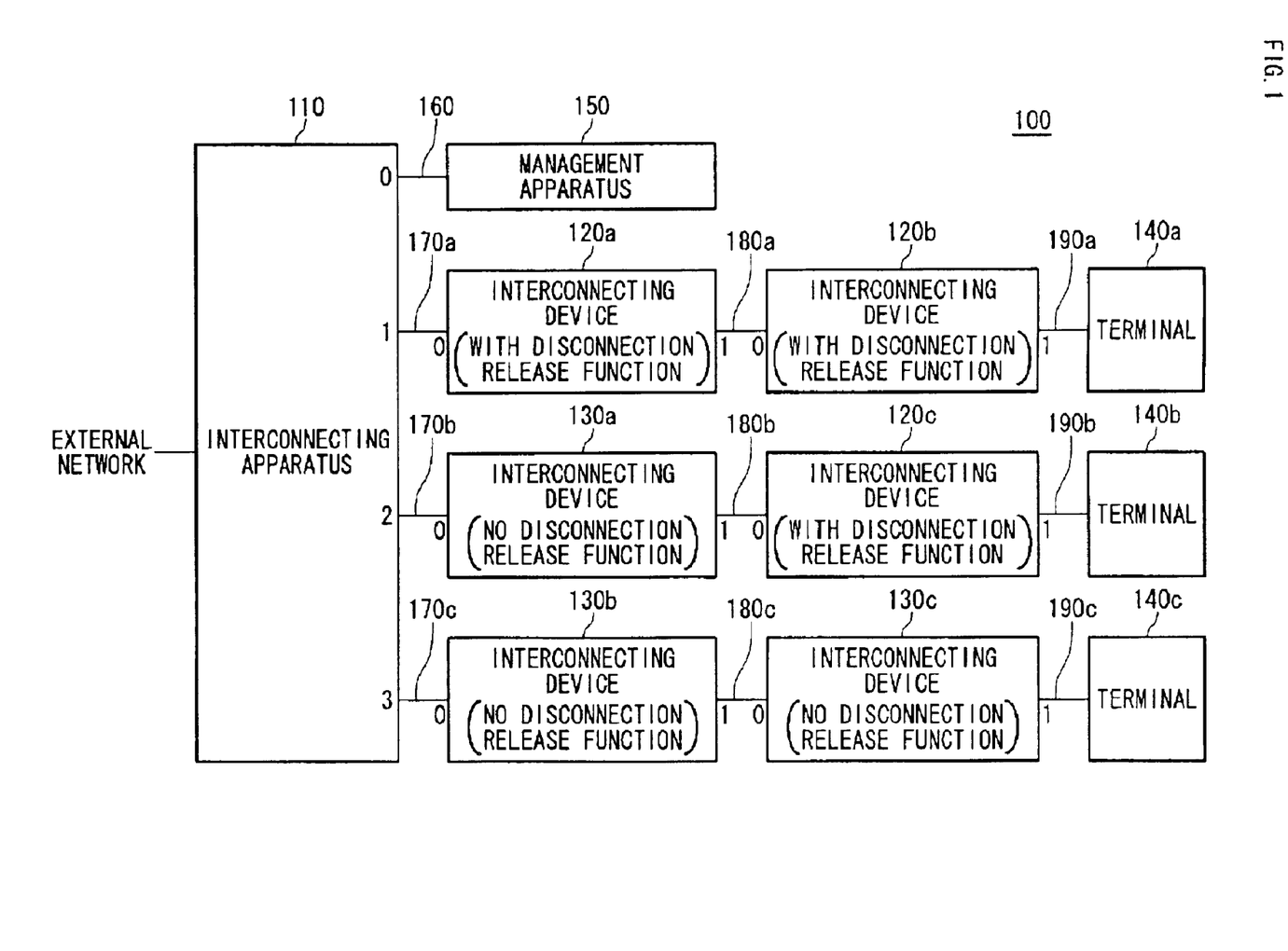
FIG. 1 shows an exemplary structure of a network 100 according to an embodiment of the present invention.

FIG. 1 shows an example of a network 100 according to an embodiment of the present invention. The network 100 includes an interconnecting apparatus 110, interconnecting devices 120a, 120b, 120c, 130a, 130b and 130c, terminals 140a, 140b and 140c and a management apparatus 150.

The interconnecting apparatus 110 interconnects data transfer between an external network, the management apparatus 150 and the terminals 140a, 140b and 140c. The interconnecting apparatus 110 may be an interconnecting device such as a hub, a switch, a router or a gateway or a combination thereof.

The interconnecting devices 120a, 120b and 120c are interconnecting devices each of which interconnects communication between two transmission media and has a disconnect function for disconnecting the communication to one transmission medium in a case where the communication from the other transmission medium has been disconnected. Each of the interconnecting devices 120a, 120b and 120c also has a disconnection release function for releasing an operation by the disconnect function in accordance with a request from the management apparatus 150. The interconnecting devices 120a, 120b and 12c may be interconnecting devices such as repeaters or media converters.

Each of the interconnecting devices 130a, 130b and 130 is an interconnecting device which interconnects communication between two transmission media and has the disconnect function. Unlike the interconnecting devices 120a, 120b, and 120c, the interconnecting devices 130a, 130b and 130c do not have the disconnection release function. The interconnecting devices 130a, 130b and 130c may be interconnecting devices such as repeaters or media converters.

The terminals 140a, 140b and 140c perform data transmission and data receiving with each other via the interconnecting apparatus 110, or perform data transmission and data receiving with the external network via the interconnecting apparatus 110.

The network 100 has three similar communication paths including a communication path between the interconnecting apparatus 110 and the terminal 140a, a communication path between the interconnecting apparatus 110 and the terminal 140b and a communication path between the interconnecting apparatus 110 and the terminal 140c.

The communication path between the interconnecting apparatus 110 and the terminal 140a is a path formed by the interconnecting devices 120a and 120b connected in series. A port 0 of the interconnecting device 120a is connected to the interconnecting apparatus 110 via a transmission medium 170a. The interconnecting device 120b is connected at a port 0 thereof to a port 1 of the interconnecting device 120a via a transmission medium 180a, while being connected at a port 1 thereof to the terminal 140a via a transmission medium 190a.

The communication path between the interconnecting apparatus 110 and the terminal 140b is a path formed by the interconnecting devices 130a and 120c connected in series. A port 0 of the interconnecting device 130a is connected to the interconnecting apparatus 110 via a transmission medium 170b. The interconnecting device 120c is connected at a port 0 thereof to a port 1 of the interconnecting device 130a via a transmission medium 180b, while being connected at a port 1 thereof to the terminal 140b via a transmission medium 190b.

The communication path between the interconnecting apparatus 110 and the terminal 140c is a path formed by the interconnecting devices 130b and 130c connected in series. A port 0 of the interconnecting device 130b is connected to the interconnecting apparatus 110 via a transmission medium 170c. The interconnecting device 130c is connected at a port 0 thereof to a port 1 of the interconnecting device 130b via a transmission medium 180c, while being connected at a port 1 thereof to the terminal 140c via a transmission medium 190c.

For simpler description, the transmission media 170a, 170b, 170c, 180a, 180b, 180c, 190a, 190b and 190c according to the present embodiment are assumed to be of the same type, for example, based on 100BASE-TX standard. Alternatively, a part or all of the transmission media 170a, 170b, 170c, 180a, 180b, 180c, 190a, 190b and 190c may be of different types. For example, the transmission media 170a, 170b and 170c and the transmission media 190a, 190b and 190c may be UTP cables based on 100BASE-TX standard, while the transmission media 180a, 180b and 180c may be optical fibers based on 100BASE-FX standard.

The management apparatus 150 is connected to the interconnecting apparatus 110 via a transmission medium 160, and manages the interconnecting devices 120a, 120b, 120c, 130a, 130b and 130c and the terminals 140a, 140b and 140c. In order to manage a communication device, such as an interconnecting device and a terminal, the management apparatus 150 transmits a management message to the communication device. The management apparatus 150 of the present embodiment supports, as the management message, a communication status get message for getting a communication status of the communication device managed by the management apparatus 150 and a disconnection release message for releasing the operation by the disconnect function of each of the interconnecting devices 120a, 120b and 120c. The management apparatus 150 may realize the management message by using SET REQUEST message or GET REQUEST message of SNMP (Simple Network Management Protocol), for example.

Figure 2:
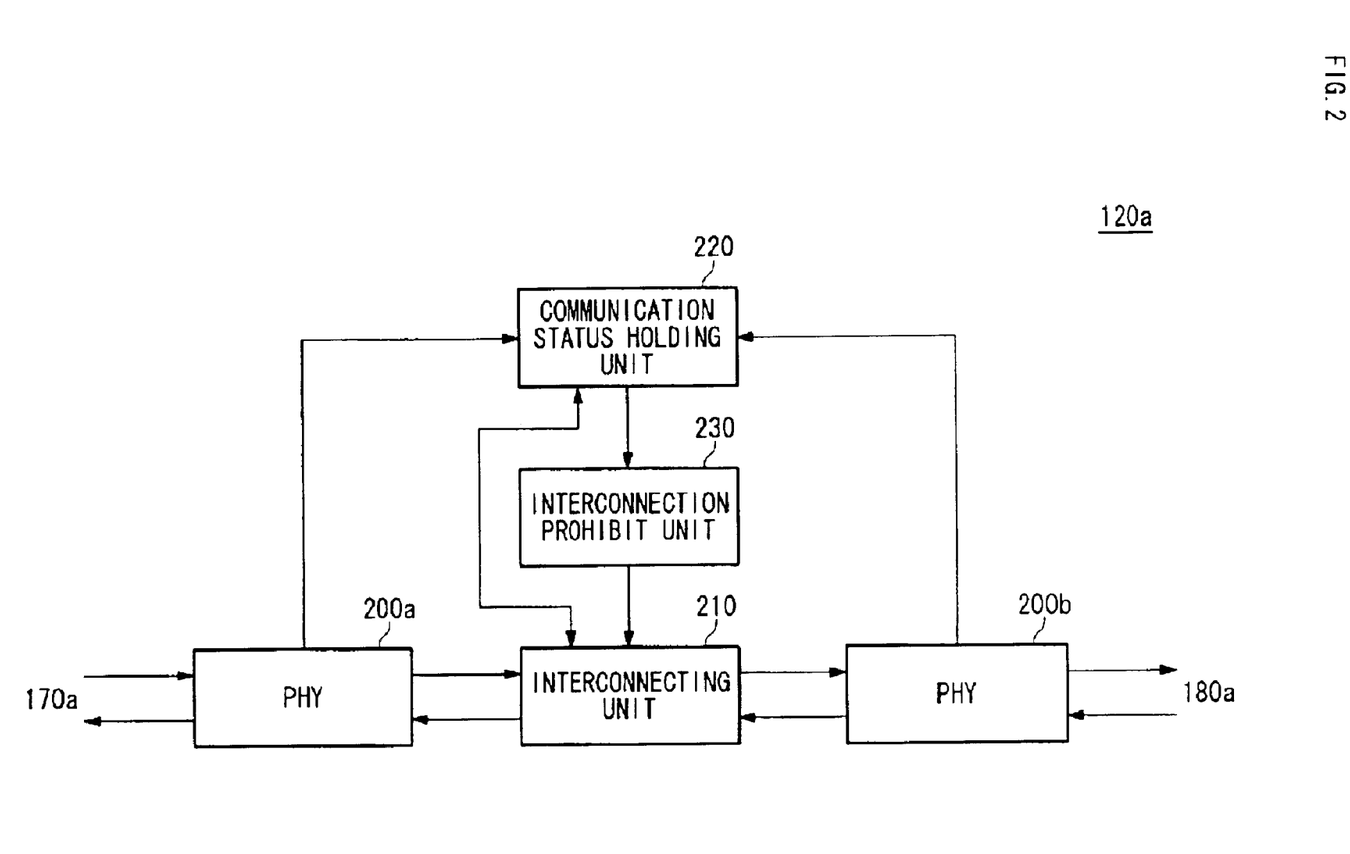
FIG. 2 shows an exemplary structure of an interconnecting device 120*a* according to an embodiment of the present invention.

FIG. 2 shows an exemplary structure of the interconnecting device 120a according to the present embodiment. The interconnecting devices 120b, 120c, 130a, 130b and 130c of the present embodiment have substantially the same structure as that of the interconnecting device 120a and therefore the description thereof is omitted, except for the description regarding differences between the interconnecting devices 120b, 120c, 130a, 130b and 130c and the interconnecting device 120a.

The interconnecting device 120a has PHYs 200a and 200b, an interconnecting unit 210, a communication status holding unit 220 and an interconnection prohibit unit 230.

The PHYs 200a and 200b are physical layer devices that respectively connect transmission media 170a and 180a to the interconnecting unit 210. Each of the PHYs 200a and 200b performs conversion between the associated transmission medium 170a or 180a and MII (Media Independent Interface) based on IEEE 802.3 and is connected to the interconnecting unit 210 via the MII.

The interconnecting unit 210 interconnects communication between the PHY 200a and the PHY 200b. The interconnecting unit 210 also has a disconnect function for prohibiting the communication between the PHYs 200a and 200b in accordance with an instruction from the interconnection prohibit unit 230. Moreover, when receiving a communication status get message for the interconnecting device 120a, that was received from the PHY 200a, the interconnecting unit 210 sends back, via the PHY 200a, a communication status, containing operation statuses of the PHYs 200a and 200b held by the communication status holding unit 220 and the presence or absence of trouble in the interconnecting device 120a and the like, as a communication status reply message. Similarly, when receiving the communication status get message for the interconnecting device 120a, that was received from the PHY 200b, the interconnecting unit 210 sends back, via the PHY 200b, the communication status of the interconnecting device 120a as the communication status replay message. The reply message responding to the management message is not prohibited even in a case where communication between the PHYs 200a and 200b is prohibited. Thus, the interconnecting device 120a can transmit/receive the reply message to/from the management apparatus 150 whether or not the prohibition of the interconnection is set.

In addition, in a case where the transmission to the transmission medium 170a via the PHY 200a and the transmission to the transmission medium 180a via the PHY 200b are disconnected by the disconnect function, each of the interconnecting devices 120a, 120b and 120c can release the disconnect operation by the disconnect function of the interconnecting unit 210 in accordance with a disconnection release message received from the management apparatus 150.

The communication status holding unit 220 acquires information indicating the communication statuses of the PHY 200a and 200b and trouble information indicating the presence or absence of trouble in the interconnecting device 120a, and holds the acquired information as the communication status of the interconnecting device 120a.

The interconnection prohibit unit 230 refers to the information indicative of the communication status and the trouble information, that are held by the communication status holding unit 220, and controls the interconnecting unit 210 so as to permit or prohibit the interconnection between the transmission medium 170a and the transmission medium 180a. More specifically, the interconnection prohibition unit 230 disconnects the transmission to the transmission medium 170a by the PHY 200a and the transmission to the transmission medium 180a by the PHY 200b in a case where the transmission from the transmission medium 170a or 180a has been disconnected. The PHY 200a realizes the disconnection by prohibiting data transmission to the transmission medium 170a and transmission of an idle signal in a case of transmitting no data. The PHY 200b also realizes the disconnection of the transmission to the transmission medium 180a in a manner similar to that of the PHY 200a.

The interconnecting devices 130a, 130b and 130c have no disconnection release function and therefore perform different operations from the operation of the interconnecting device 120a with respect to the disconnect function. More specifically, the interconnecting device 130a disconnects only the transmission to the transmission medium 180b by the PHY 200b in a case where the transmission from the transmission medium 170b has been disconnected. Moreover, the interconnecting device 130a disconnects the transmission to the transmission medium 170b by the PHY 200a in a case where the transmission from the transmission medium 180b has been disconnected. The interconnecting devices 130b and 130c operate in a manner similar to that of the interconnecting device 130a.

Figure 3:
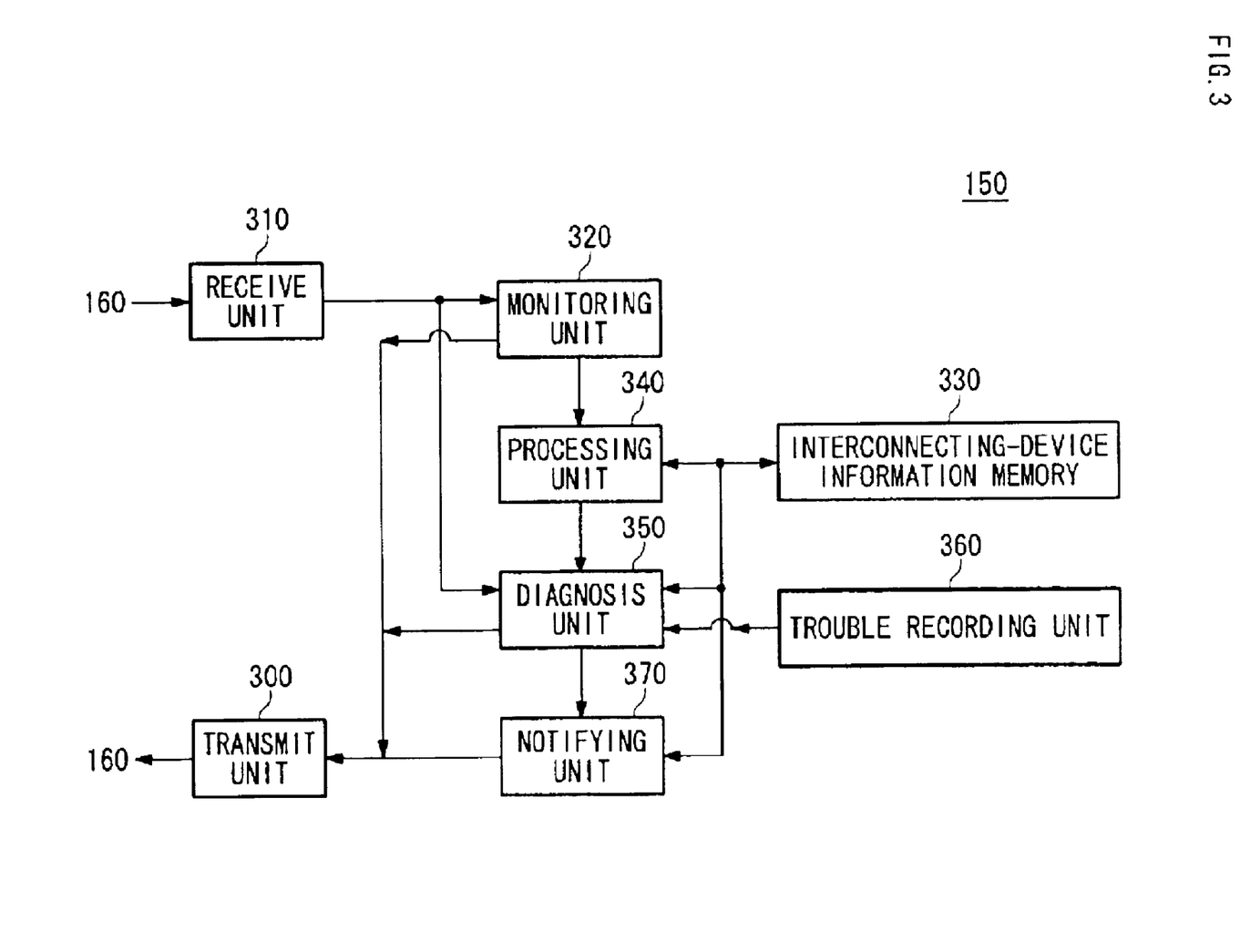
FIG. 3 shows an exemplary structure of a management apparatus 150 according to an embodiment of the present invention.

FIG. 3 shows an exemplary structure of the management apparatus 150 according to the present embodiment. The management apparatus 150 includes a transmit unit 300, a receive unit 310, a monitoring unit 320, an interconnecting-device information memory 330, a processing unit 340, a diagnosis unit 350, a trouble recording unit 360 and a notifying unit 370.

The transmit unit 300 transmits the management message, such as the communication status get message and the disconnection release message, that is generated by the management apparatus 150, to the interconnecting apparatus 110 via a transmission medium 160.

The receive unit 310 receives the communication status reply message that is a reply message responding to the communication status get message, and the disconnection release reply message, that is a reply message to the disconnection release message, from a communication device in the network 100.

The monitoring unit 320 monitors whether or not each of the communication path between the interconnecting device 110 and the terminal 140a, the communication path between the interconnecting device 110 and the terminal 140b and the communication path between the interconnecting device 110 and the terminal 140c has been disconnected, for example, by regularly transmitting a ping message to the transmission media 170a, 170b and 170c.

The interconnecting-device information memory 330 stores interconnecting device information containing information whether or not each of the interconnecting devices 120a, 120b, 120c, 130a, 130b and 130c has the disconnection release function.

The processing unit 340 determines based on the interconnecting device information stored in the interconnecting-device information memory 330 whether or not each of the interconnecting devices forming a communication path that has been disconnected has the disconnection release function.

The diagnosis unit 350 receives, from the processing unit 340, disconnected path information specifying the communication path that has been disconnected and disconnection release information indicating whether or not an interconnecting device on the disconnected communication path has the disconnection release function. Then, the diagnosis unit 350 controls, one by one, the operation of each of the interconnecting devices with the disconnection release function, which are connected to the disconnected communication path, so as to acquire the communication statuses of the interconnecting devices and transmission media on the disconnected communication path. More specifically, the diagnosis unit 350 transmits the communication status get message to a first one of the interconnecting device(s) with the disconnection release function. The diagnosis unit 350 then receives the communication status reply message the first interconnecting device sends back in response to the communication status get message. The diagnosis unit 350 then acquires the communication status of the first interconnecting device from the received communication status reply message.

After acquiring the communication status of the first interconnecting device, the diagnosis unit 350 diagnoses the possibility of trouble in the interconnecting device(s) or transmission medium/media in the disconnected communication path by using the communication statuses acquired from the received communication status reply message.

Moreover, in a case where the diagnosis unit 350 determines that there was no trouble in the communication between the management apparatus 150 and the first interconnecting device as a result of the above diagnosis, the diagnosis unit 350 transmits the disconnection release message to the first interconnecting device, thereby releasing the disconnection of the first interconnecting device. Then, the management apparatus 150 transmits the communication status get message to a second one of the interconnecting devices in the disconnected communication path having the disconnection release function, which is located at a closer position to the corresponding terminal than the first interconnecting device. Then, the diagnosis unit 350 diagnoses the possibility of trouble in the interconnecting device(s) and transmission medium/media located between the first interconnecting device and the second interconnecting device on the disconnected communication path by using the communication status reply message received from the second interconnecting device.

In addition to the above, when the diagnosis unit 350 has detected trouble in a communication device or transmission medium in the network 100, the diagnosis unit 350 stores a trouble log in the trouble recording unit 360.

The trouble recording unit 360 stores the trouble log that is information describing a history of troubles that occurred in each of the communication devices and/or transmission media in the network 100. The diagnosis unit 350 refers to the trouble recording unit 360 in a case where a site having trouble cannot be identified in the communication device(s) and/or transmission medium/media on the disconnected communication path, so as to estimate the degree of the possibility of trouble by using the trouble log of the communication devices and/or transmission media on a similar communication path which has a similar configuration to that of the disconnected communication path.

The notifying unit 370 notifies a manager of the network 100 that the communication device and/or transmission medium, diagnosed by the diagnosis unit 350 as having possible trouble, may have trouble. The notifying unit 370 illustrates the possibility of trouble in the communication device or transmission medium on a display of the management apparatus 150, as a notifying means. In addition, the notifying unit 370 may notify the manager of the network 100 of the possibility of trouble in the communication device or transmission medium by means of a buzzer or e-mail. Moreover, the notifying unit 370 may notify, via the interconnecting device 110, a remote management apparatus provided on the external network of the possibility of trouble in the communication device or transmission medium.

Figure 4:
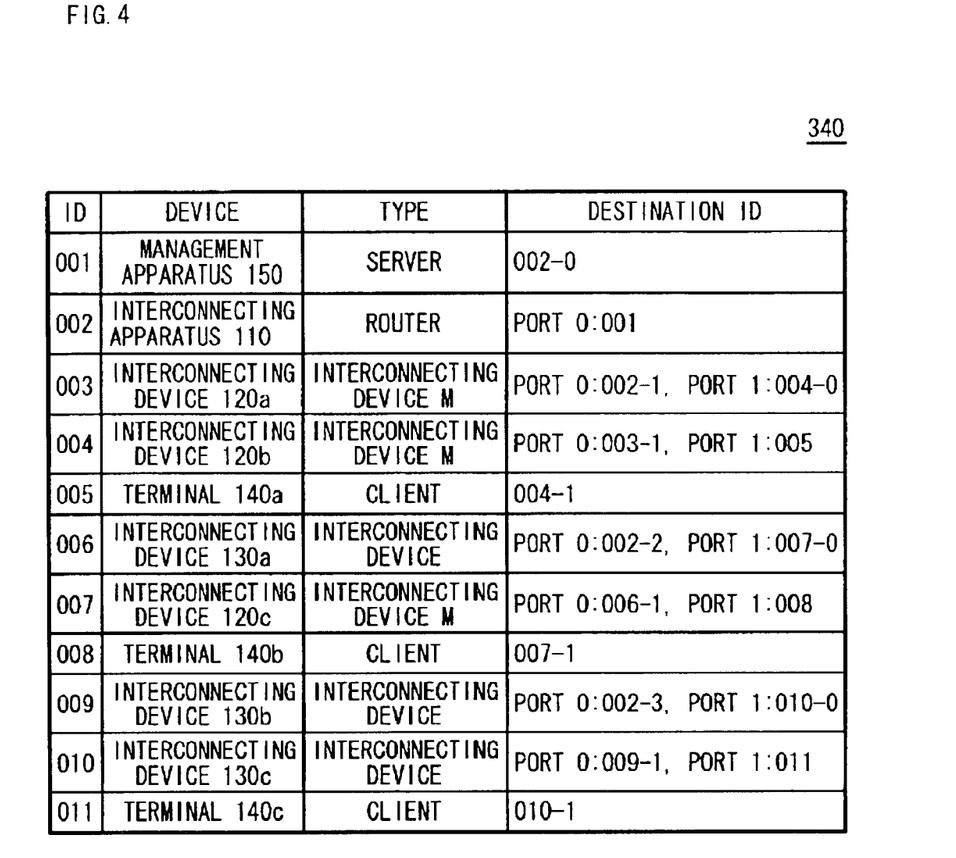
FIG. 4 shows an example of interconnecting device information stored in tabular form in a processing unit 340 according to an embodiment of the present invention.

FIG. 4 shows the interconnecting device information stored in the processing unit 340 according to the present embodiment in the form of a table. The interconnecting device information according to the present embodiment has an ID field, a device field, a type field and a destination ID field.

The ID field stores an identifier for identifying each communication device in the network 100. The device field holds a name of the device. The type field holds a type of the associated device. The type field according to the present embodiment holds "server" for the management apparatus 150, "router" for the interconnecting apparatus 110, "interconnecting device M" for the interconnecting device 120a, 120b or 120c with the disconnection release function (i.e., with a management function), "interconnecting device" for the interconnecting device 130a, 130b or 130c with no disconnection release function (i.e., with no management function) and "client" for the terminal 140a, 140b or 140c. The destination ID field holds an identifier for identifying a device to which the associated device in the same row is to be connected. For example, the destination ID corresponding to the management apparatus 150, "002-2" indicates that the management apparatus 150 is connected to the port 0 of the interconnecting apparatus 110 to which the ID=002 is assigned. Moreover, the destination ID corresponding to the interconnecting device 120a, "port 0:002-1, port 1:004-0" indicates that the port 0 of the interconnecting device 120a is connected to the port 1 of the interconnecting apparatus 110 having the ID=002 while the port 1 of the interconnection device 120a is connected to the port 0 of the interconnecting device 120b having the ID=004.

Figure 5:
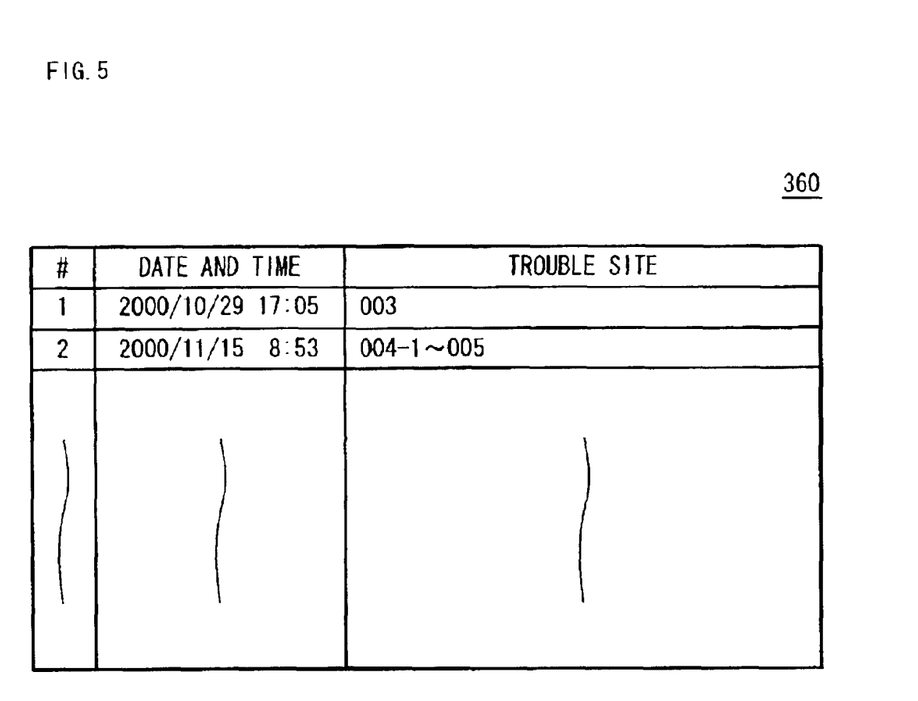
FIG. 5 shows an example of a trouble log stored in tabular form in a trouble recording unit 360 according to an embodiment of the present invention.

FIG. 5 shows a trouble log stored in the trouble recording unit 360 according to the present embodiment in the form of a table. The trouble log of the present embodiment includes a date and time field and a trouble site field.

The date and time field stores a date and time at which trouble occurred in any of the interconnecting devices and/or transmission media in the network 100. The trouble site field stores a site where the corresponding trouble occurred by using the identifier of the communication device. For example, the first row of the table shown in FIG. 5 indicates that the trouble occurred in the interconnecting device 120a having the identifier of ID=003. The second row of the table shown in FIG. 5 indicates that the trouble occurred in the transmission medium between the port 1 of the interconnecting device 120b having the identifier of ID=004 and the terminal 140a having the ID=005.

Figure 6:
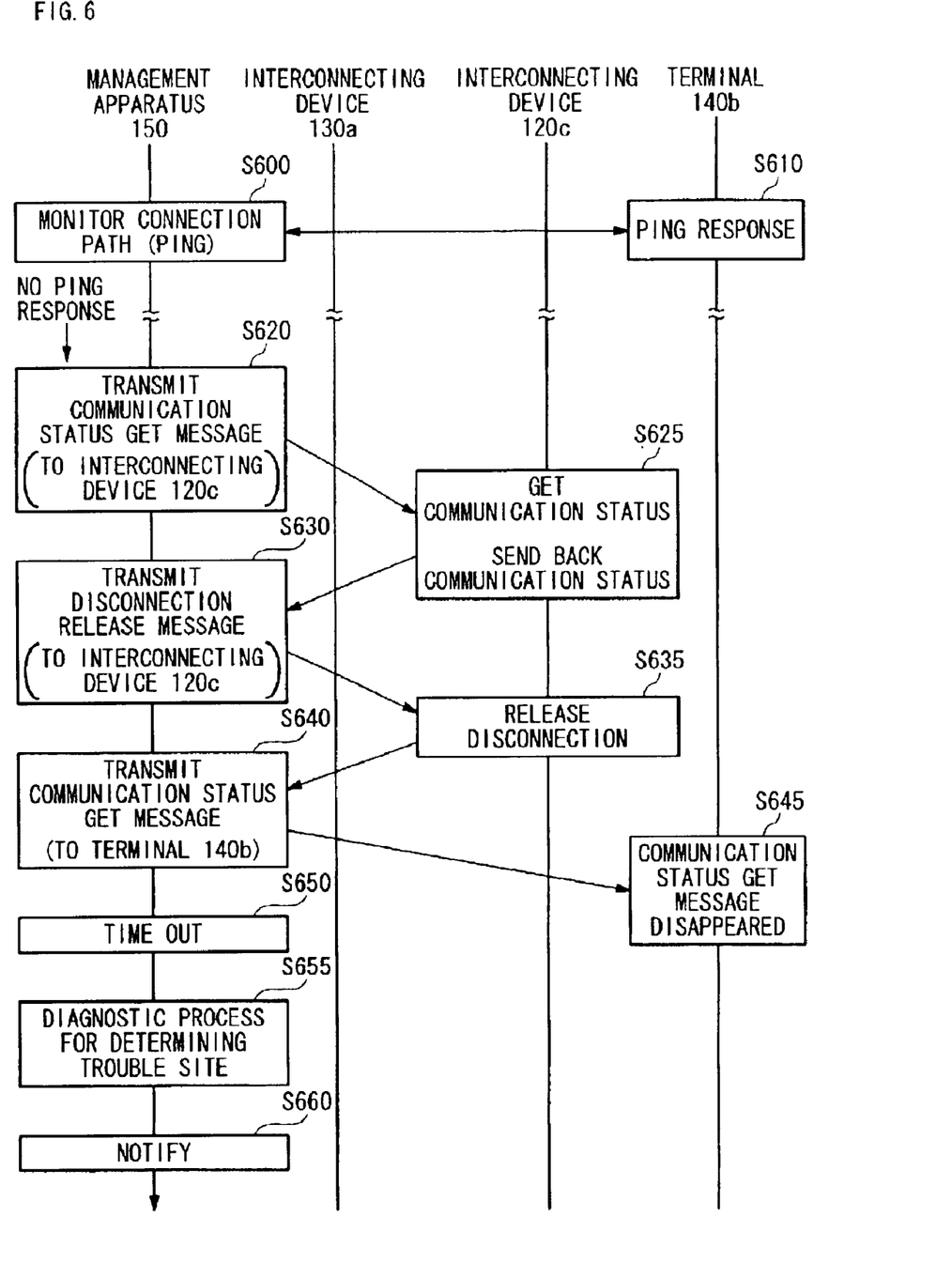
FIG. 6 is a sequence of trouble diagnosis in the network 100 according to an embodiment of the present invention.

FIG. 6 illustrates an exemplary trouble diagnosis sequence in the network 100 according to the present embodiment in a case where the management apparatus 150 diagnoses the communication path between the interconnecting apparatus 110 and the terminal 140b.

The monitoring unit 320 in the management apparatus 150 regularly transmits a ping message to the terminal 140b, thereby monitoring whether or not the communication path between the interconnecting apparatus 110 and the terminal 140b has been disconnected (Step S600). The terminal 140b responds to the ping message received from the management apparatus 150 if the communication path between the interconnecting apparatus 110 and the terminal 140b is not disconnected (Step S610). The monitoring unit 320 in the management apparatus 150 determines that the communication path between the interconnecting apparatus 110 and the terminal 140b is not disconnected in a case where the monitoring unit 320 received the response to the ping message from the terminal 140b, so as to go back to Step S600. On the other hand, in a case where the monitoring unit 320 in the management apparatus 150 did not receive the response to the ping message from the terminal 140b, the monitoring unit 320 determines that the communication path between the interconnecting apparatus 110 and the terminal 140b has been disconnected, so as to go to Step S620.

In a case where the communication path between the interconnecting apparatus 110 and the terminal 140b has been disconnected, the processing unit 340 in the management apparatus 150 receives, from the monitoring unit 320 in the management apparatus 150, the disconnected path information that specifies the disconnected communication path. The processing unit 340 in the management apparatus 150 determines whether or not each of the interconnecting devices 130a and 120c, connected on the communication path between the interconnecting apparatus 110 and the terminal 140b specified by the disconnected path information, has the disconnection release function based on the contents of the type field of the interconnecting device information stored in the interconnecting device information memory 330. More specifically, the processing unit 340 in the management apparatus 150 determines that the interconnecting device 130a (type field "interconnecting device") does not have the disconnection release function while the interconnecting device 120c (type field "interconnecting device M") has the disconnection release function. Then, the diagnosis unit 350 in the management apparatus 150 receives the disconnected path information and the disconnection release function information from the processing unit 340. The diagnosis unit 350 in the management apparatus 150 then transmits the communication status get message to be delivered to the interconnecting device 120c, that was specified as a result of the above process as having the disconnection release function and is the closest to the management apparatus 150 on the communication path (Step S620). The interconnecting device 130a transfers the communication status get message transmitted from the management apparatus 150 to the interconnecting device 120c via the transmission medium 180b.

The interconnecting device 120c receives the communication status get message and then acquires the communication status of the interconnecting device 120c from the communication status holding unit 220 and the interconnection prohibit unit 230 in the interconnecting device 120c. The interconnecting device 120c then generates a communication status reply message containing the acquired communication status and transmits it to the management apparatus 150 (Step S625). The diagnosis unit 350 in the management apparatus 150 receives the communication status reply message transmitted by the interconnecting device 120c and then determines that there is no trouble in the communication between the interconnecting apparatus 110 and the interconnecting device 120c. The diagnosis unit 350 in the management apparatus 150 then transmits the disconnection release message to be delivered to the interconnecting device 120c (Step S630). When receiving the disconnection release message, the interconnecting device 120c releases the disconnection of the transmission to the transmission media 180b and 190b and transmits the disconnection release reply message to be delivered to the management apparatus 150 (Step S635).

Next, the diagnosis unit 350 in the management apparatus 150 transmits the communication status get message to be delivered to the terminal 140b, after receiving the disconnection release reply message (Step S640). In a case where there is any trouble in the communication path between the interconnecting device 120c and the terminal 140b, the communication status get message for the terminal 140b that was transmitted by the diagnosis unit 350 is lost between the interconnecting device 120c and the terminal 140b (Step S645). In this case, the diagnosis unit 350 in the management apparatus 150 detects by time-out, for example, that no response to the communication status get message was received for a predetermined time period (Step S650).

When detecting the time-out in Step S650, the diagnosis unit 350 in the management apparatus 150 determines that there is a possibility of trouble in the transmission medium 190b or the terminal 140b. In addition, the diagnosis unit 350 in the management apparatus 150 estimates the degree of the possibility of trouble in the transmission medium 190b or terminal 140b by using the trouble log in the trouble recording unit 360 (Step S655). Then, the notifying unit 370 in the management apparatus 150 notifies the manager of the network 100 that the transmission medium 190b and the terminal 140b, diagnosed by the diagnosis unit 350 to have the possibility of trouble, may have trouble (Step S660).

Figure 7:
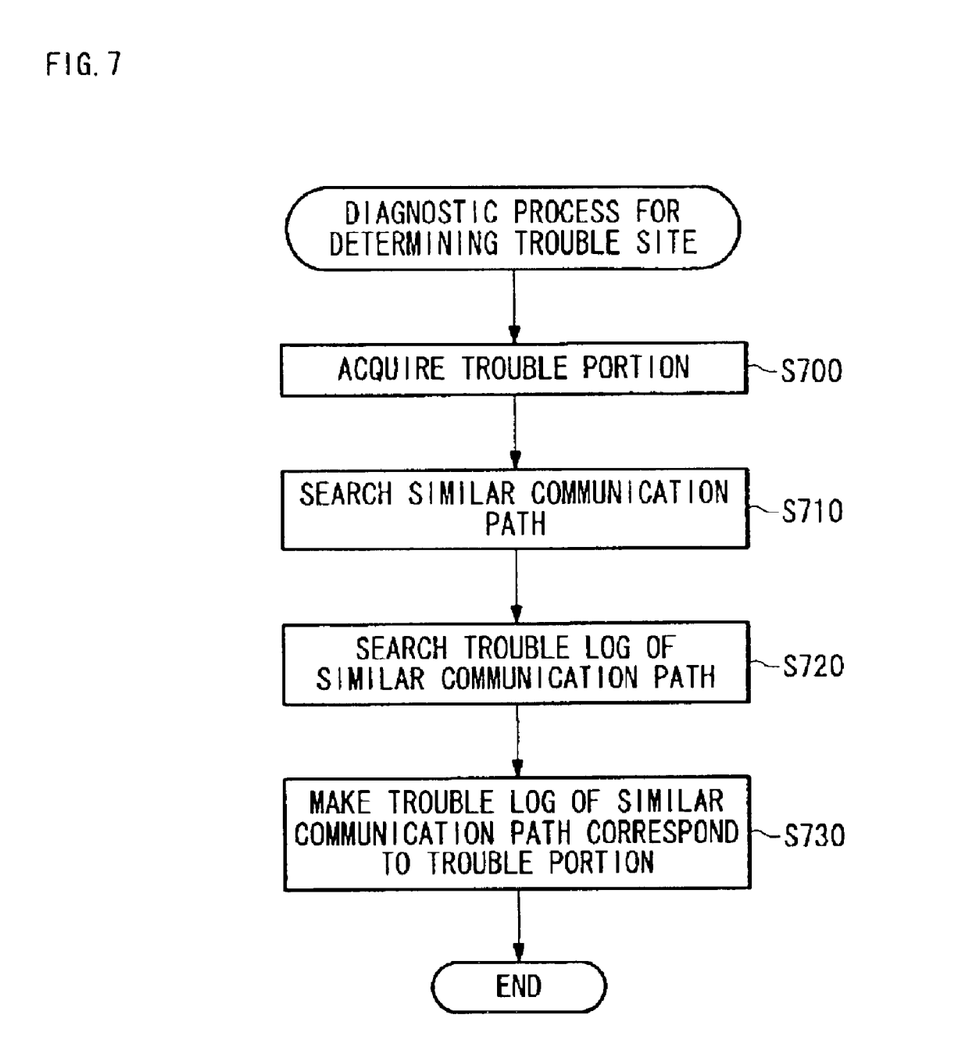
FIG. 7 shows a sequence of a diagnostic process for determining a trouble site according to an embodiment of the present invention.

FIG. 7 shows a flow of a diagnostic process for determining the trouble site (Step S655 in FIG. 6) according to the present embodiment.

The diagnosis unit 350 in the management apparatus 150 finds a trouble site that is a portion of a disconnected communication path where trouble may have occurred (Step S700). In the present embodiment, the trouble site is the transmission medium 190b and the terminal 140b.

Next, the diagnosis unit 350 refers to the interconnecting device information in the processing unit 340 so as to search for a similar communication path having a configuration which is similar to that of the communication path of the trouble site (Step S710). More specifically, the diagnosis unit 350 considers, as the similar communication path, the communication path between the interconnecting apparatus 110 and the terminal 140a and the communication path between the interconnecting apparatus 110 and the terminal 140c both of which have a configuration in which a first interconnecting device, a second interconnecting device and the terminal are connected in that order, as in the communication path between the interconnecting apparatus 110 and the terminal 140b including the trouble site. The diagnosis unit 350 may determine the similar communication path by using a different region from that described above. That is, the diagnosis unit 350 may search a portion similar to the trouble site including the transmission medium 190b and the terminal 140b by using the interconnecting device information in the processing unit 340, so as to determine the transmission medium 190a and terminal 140a and the transmission medium 190c and terminal 140c as similar portions.

The diagnosis unit 350 refers to the trouble log in the trouble recording unit 360 so as to search the trouble log for the similar communication path thus determined (Step S720). The diagnosis unit 350 then estimates the degree of the possibility of trouble in the transmission medium 190b and the terminal 140b, both of which exist on the disconnected communication path between the interconnecting apparatus 110 and the terminal 140b and which have yet not been diagnosed to have no trouble, by using the trouble log of the transmission medium and the interconnecting device connected at the corresponding portion on the similar communication path. More specifically, the diagnosis unit 350 estimates that the possibility of trouble in the transmission medium 190b is greater than that in the terminal 140b because there is a trouble log for the transmission medium 190a between the interconnecting device 120b and the terminal 140a (see the second row in FIG. 5) (Step S730). In this manner, the diagnosis unit 350 refers to the corresponding trouble log of the communication device and transmission medium contained in the disconnected communication path and in the similar communication path, so as to estimate that the possibility of trouble is greater in the communication device and/or the transmission medium corresponding to a site where trouble has frequently occurred, or the closest corresponding trouble site to a site of frequent trouble.

Figure 8:
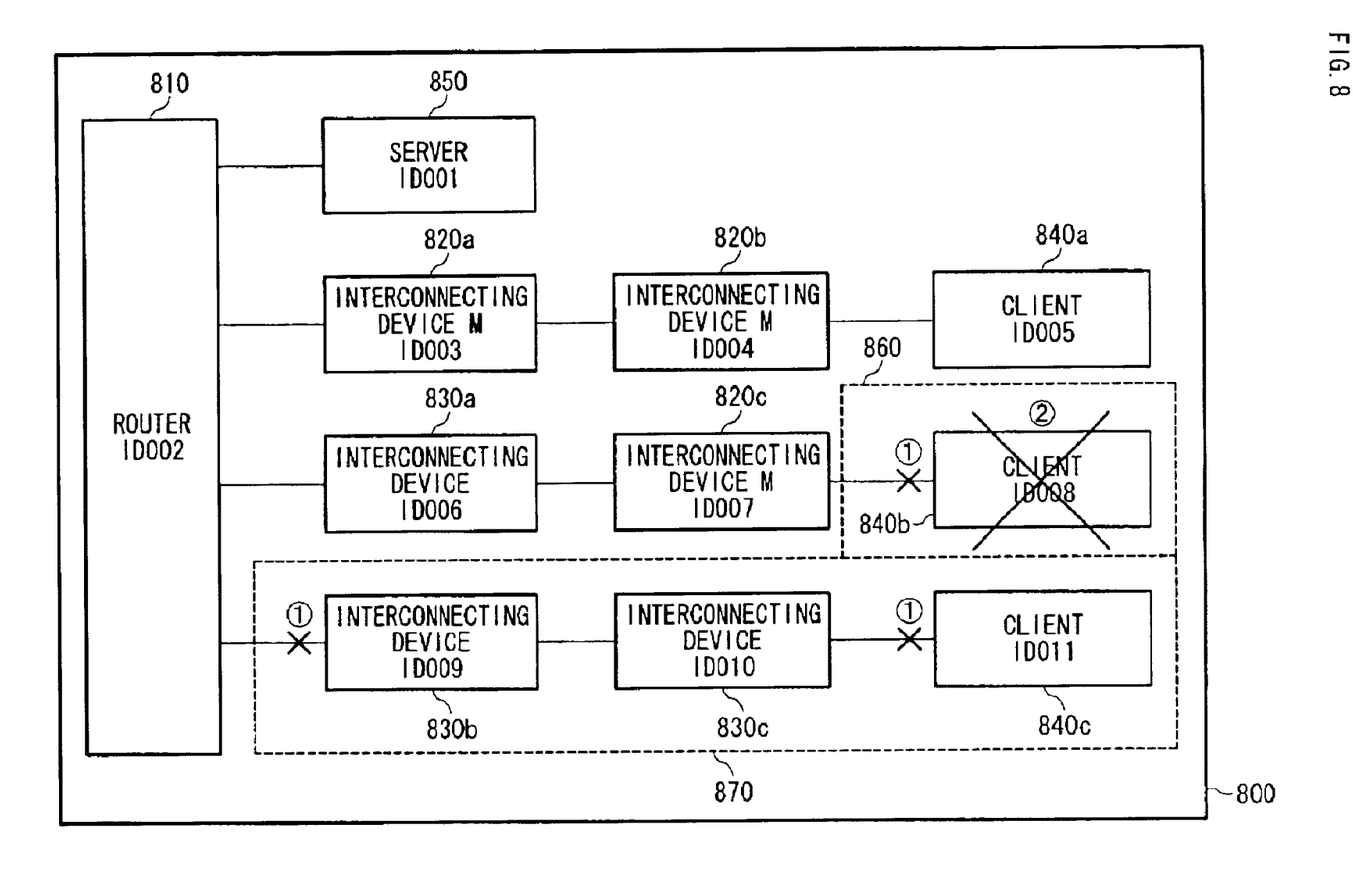
FIG. 8 shows an exemplary trouble display screen displayed by a notifying unit according to an embodiment of the present invention.

FIG. 8 illustrates an exemplary trouble display screen displayed by the notifying unit 370 according to the present embodiment. The display screen 800 contains an interconnecting apparatus object 810, interconnecting device objects 820a, 820b, 820c, 830a, 830b, and 830c, terminal objects 840a, 840b and 840c, a management apparatus object 850, and trouble communication path objects 860 and 870.

The interconnecting apparatus object 810 is a figure presented on the display screen 800 by the notifying unit 370 for representing the interconnecting apparatus 110. The interconnecting device objects 820a, 820b and 820c are figures presented on the display screen 800 by the notifying unit 370 for representing the interconnecting devices 120a, 120b and 120c, respectively. The interconnecting device objects 830*a*, 830*b* and 830*c* are figures presented on the display screen 800 by the notifying unit 370 for representing the interconnecting devices 130*a*, 130*b* and 130*c*, respectively. The terminal objects 840*a*, 840*b* and 840*c* are figures presented on the display screen 800 by the notifying unit 370 for representing the terminals 140*a*, 140*b* and 140*c*, respectively. The management apparatus object 850 is a figure presented on the display screen 800 by the notifying unit 370 for representing the management apparatus 150.

The notifying unit 370 displays, within the interconnecting apparatus object 810, the interconnecting device objects 820*a*, 820*b* and 820*c*, the interconnecting device objects 830*a*, 830*b* and 830*c*, the terminal objects 840*a*, 840*b* and 840*c* and the management apparatus object 850, data stored in the ID field and the type field of the corresponding interconnecting device information in the interconnecting-device information memory 330. Moreover, the notifying unit 370 displays the connections between the interconnecting apparatus object 810, the interconnecting device objects 820*a*, 820*b* and 820*c*, the interconnecting device objects 830*a*, 830*b* and 830*c*, the terminal objects 840*a*, 840*b* and 840*c* and the management apparatus object 850 based on data in the destination ID field in the interconnecting device information stored in the interconnecting-device information memory 330.

The trouble communication path objects 860 and 870 represent the communication device and transmission medium having the possibility of trouble. The display screen 800 of the present embodiment shows that there is the possibility of trouble in the communication path between the transmission medium 190*b* and the terminal 140*b* and the communication path between the interconnecting apparatus 110 and the terminal 140*c* by using the trouble communication path objects 860 and 870, respectively. In addition, the notifying unit 370 receives the degrees of the possibility of trouble for the communication device(s) and transmission medium/media contained in a trouble site from the diagnosis unit 350 and shows whether the possibility of trouble is large or small, or the presence or absence of trouble so as to allow it to be visually recognized. More specifically, the diagnosis unit 350 refers to the trouble log in the trouble recording unit 360, so as to determine that the communication path connecting the interconnecting apparatus 110 and the terminal 140*b* has a greater possibility of trouble in the transmission medium 190*b* and a lesser possibility of trouble in the terminal 140*b*. Based on this determination, the notifying unit 370 shows that there is the greatest possibility of trouble in the transmission medium 190*b* designated with "1" and shows that the terminal 140*b* has a next greatest possibility of trouble with a designation "2". Similarly, the diagnosis unit 350 refers to the trouble log in the trouble recording unit 360, so as to determine that, in the communication path connecting the interconnecting apparatus 110 and the terminal 140*c*, the possibility of trouble is greater in the transmission media 170*c* and 190*c* and is lesser in the other communication device and transmission media. Based on this determination, the notifying unit 370 shows that the transmission media 170*c* and 190*c* have a greater possibility of trouble with a designation "1" so as to allow a manager to recognize the probable location of trouble in the communication path.

As described above, in a case where a communication path in the network 100 has been disconnected, the management apparatus 150 of the present embodiment can in sequence control the interconnecting devices in the communication path that has been disconnected, which have the disconnection release function, so as to diagnose the possibility of trouble in the interconnecting device(s) or transmission medium/media on the communication path. Moreover, the management apparatus 150 of the present embodiment can estimate the degrees of the possibilities of trouble for a plurality of interconnecting devices or transmission media that may have trouble, based on the trouble log regarding a similar communication path having a configuration similar to that of the disconnected communication path. Thus, the manager of the network 100 can find the interconnecting device or transmission medium that was estimated to have a greater possibility of trouble by observing the trouble display screen of the management apparatus 150, thereby reducing the management work by first managing that portion of the network which was judged as having a greater possibility of trouble.

Figure 9:
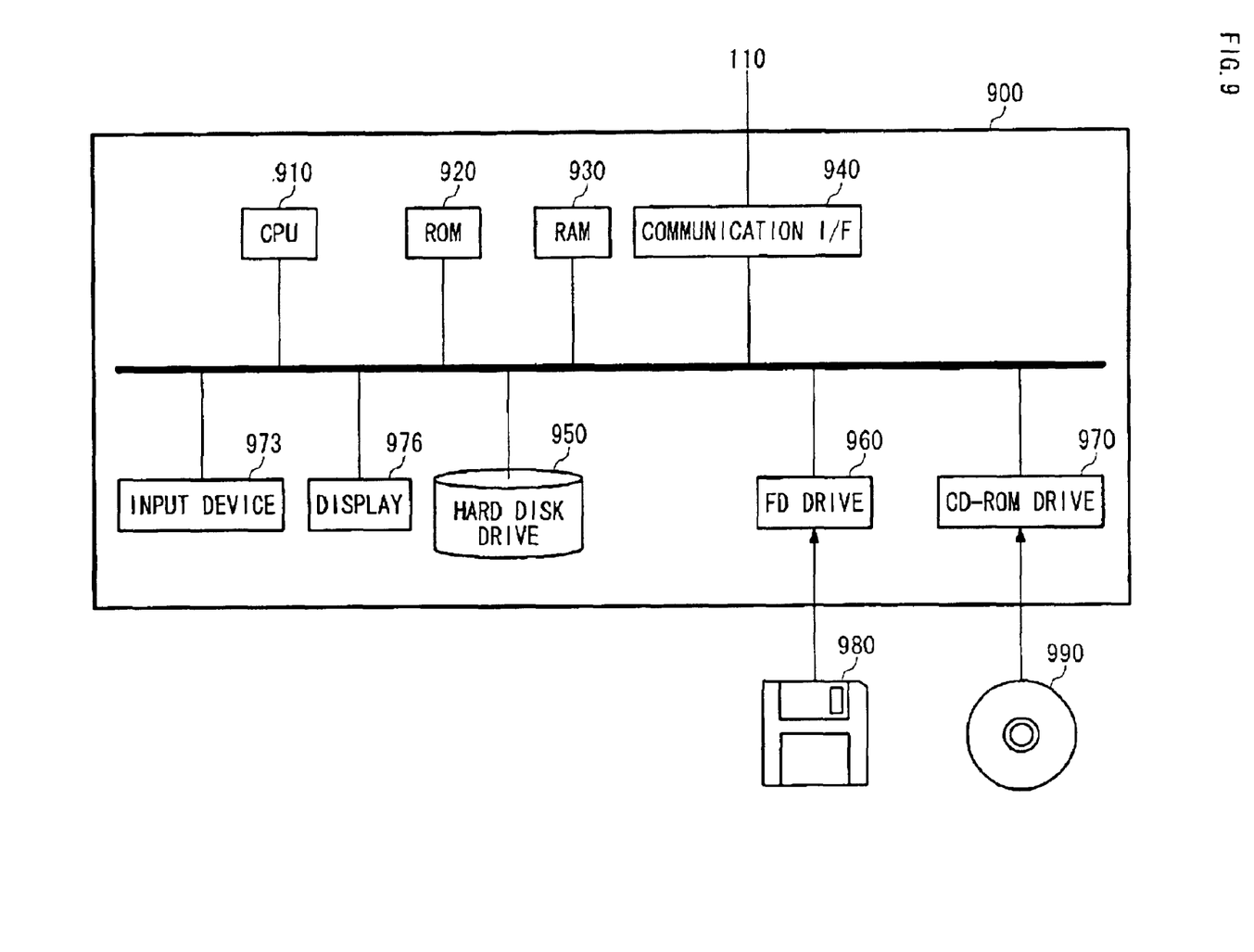
FIG. 9 shows an exemplary hardware configuration of the management apparatus 150 of an embodiment of the present invention.

FIG. 9 shows an exemplary hardware configuration of the management apparatus 150 according to an embodiment of the present invention. The functions of the management apparatus 150 of the present embodiment are realized by cooperation of a computer 900, including a CPU 910; a ROM 920; a RAM 930; a communication interface 940; a hard disk drive 950; an input device 973; and a display 976, and at least one program executed on the computer 900. The computer 900 may further include a floppy disk drive 960 and/or a CD-ROM drive 970.

The program for realizing the management apparatus 150 includes a transmit module, a receive module, a monitoring module, an interconnecting device information storing module, a determining module, a diagnosis module, a trouble recording module and a notify module. These modules are a program for making the computer 900 operate as the transmit unit 300, the receive unit 310, the monitoring unit 320, the interconnecting-device information memory 330, the processing unit 340, the diagnosis unit 350, the trouble recording unit 360 and the notifying unit 370.

The aforementioned program or modules may be stored in external storage medium. As the storage medium, other than the floppy disk 980 and the CD-ROM 990, an optical recording medium such as a DVD or a PD, a magneto-optical recording medium such as an MD, a tape-like medium, or a semiconductor memory such as an IC card can be used. Moreover, a storage device such as a hard disk or a RAM provided in a server system connected to an exclusive communication network or the Internet may be used as the storage medium, so that the program can be provided to the computer 900 through an external network or a network connected to the computer 900.

As is apparent from the above, according to the present invention, management for a network formed by a plurality of interconnecting apparatuses can be realized with reduced management work and a reduced management cost.

Although the present invention has been described by way of exemplary embodiments, it should be understood that those skilled in the art might make many changes and substitutions without departing from the spirit and the scope of the present invention which is defined only by the appended claims.

What is claimed is:

1. A management apparatus for managing a network including a plurality of interconnecting devices forming one or more communication paths having one or more of said interconnecting devices connected in series, each of said interconnecting devices interconnects communication between two transmission media and has a disconnect function for disconnecting communication to at least one of said transmission media in a case where communication from the other one of said transmission media has been disconnected, and one or more of said plurality of interconnecting devices having a disconnection release function for releasing a disconnection operation by said disconnect function, said management apparatus comprising:

an interconnecting-device information memory operable to store interconnecting device information for identifying which of said interconnecting devices have said disconnection release function;

a processing unit operable to determine, in a case where one communication path has been disconnected, which of said one or more interconnecting devices has said disconnection release function based on said interconnecting device information;

a diagnosis unit operable to sequentially control said one or more interconnecting devices in said disconnected communication path having said disconnection release function to acquire corresponding communication statuses of said interconnecting devices in said disconnected communication path, and to diagnose a probable location of trouble in said disconnected communication path; and a notifying unit operable to notify, based upon said probable location of trouble diagnosed by said diagnosis unit, which of said one or more interconnecting devices and said transmission media is said probable location of trouble.

2. A management apparatus as claimed in claim 1, wherein said diagnosis unit transmits, to each of said interconnecting devices in said communication path having said disconnection release function, a communication status get message for getting a communication status of said each of said interconnecting devices, and determines the probable location of trouble by a reply message responding to said communication status get message from said each of said interconnecting devices.

3. A management apparatus as claimed in claim 2, wherein said interconnecting devices include a first interconnecting device and a second interconnecting device, each having said disconnection release function and being connected in said communication path, said diagnosis unit transmits said communication status get message to said first interconnecting device to acquire said communication status of said first interconnecting device, and in a case where it is diagnosed that there is no trouble in communication between said management apparatus and said first interconnecting device, said diagnosis unit releases an operation by said disconnect function of said first interconnecting device; transmits, via said first interconnecting device, said communication status get message to said second interconnecting device; and diagnoses the probable location of trouble between said first interconnecting device and said second interconnecting device by using said reply message responding to said communication status get message.

4. A management apparatus as claimed in claim 1, further comprising a trouble recording unit operable to store trouble information identifying occurrences of trouble in said network, wherein said diagnosis unit determines, by said trouble information for a similar communication path having a configuration similar to said disconnected communication path, a degree of the probable location of trouble for each of said interconnecting devices in said disconnected communication path for which trouble in communication has yet not been determined.

5. A management apparatus as claimed in claim 4, wherein said diagnosis unit determines the degree of the probable location of trouble for each of said interconnecting devices in said disconnected communication path by said trouble information of a corresponding interconnecting device at a corresponding position in said similar communication path.

6. A management apparatus as claimed in claim 4, wherein said notifying unit is operable to display on a display of said management apparatus, for each of said plurality of interconnecting devices in said network, whether a probability of trouble is high or low or whether or not there is trouble so as to be visually recognized.

7. A management apparatus as claimed in claim 1, further comprising a trouble recording unit operable to store trouble information identifying occurrences of trouble in said network, wherein said diagnosis unit determines, by said trouble information for a similar communication path having a configuration similar to said disconnected communication path, a degree of the probable location of trouble for each of said transmission media for which trouble in communication has yet not been determined.

8. A management apparatus as claimed in claim 7, wherein said diagnosis unit determines the degree of the probable location of trouble for said each of said transmission media by said trouble information of a corresponding transmission medium at a corresponding portion of said similar communication path.

9. A management apparatus as claimed in claim 7, wherein said notifying unit is operable to display on a display of said management apparatus, for each of said transmission media in said network, whether a probability of trouble is high or low or whether or not there is trouble so as to be visually recognized.

10. A network management method for managing a network having a plurality of interconnecting devices forming one or more communication paths by one or more of said interconnecting devices connected in series, each interconnecting device interconnects communication between two transmission media and has a disconnect function for disconnecting communication to at least one of said transmission media in a case where communication from the other one of said transmission media has been disconnected, one or more of said plurality of interconnecting devices having a disconnection release function for releasing operation of said disconnect function, the method comprising:

storing interconnecting device information for identifying which of said interconnecting devices has said disconnection release function;

determining, when one communication path has been disconnected, which of said one or more interconnecting devices in said disconnected communication path has said disconnection release function by said interconnecting device information;

sequentially controlling each of said interconnecting devices in said disconnected communication path having said disconnection release function to acquire communication statuses of said interconnecting devices in said disconnected communication path, and diagnosing a probable location of trouble in said interconnecting devices or said transmission media in said disconnected communication path; and notifying that said interconnecting devices or said transmission media have trouble based upon the probable location of trouble diagnosed for said interconnecting devices or said transmission media.

11. A computer-readable medium storing a program comprising computer executable instructions for managing a network including a plurality of interconnecting devices forming one or more communication paths with one or more of said interconnecting devices connected in series, each interconnecting device interconnects communication between two transmission media and has a disconnect function for disconnecting communication to at least one of said transmission media when communication from the other one of said transmission media has been disconnected, at least one of said plurality of interconnecting devices has a disconnection release function for releasing operation of said disconnect function, said program comprising:

a memory module operable for storing of interconnecting device information for identifying which of said interconnecting devices has said disconnection release function;

a processing module operable for determining, when one communication path has been disconnected, which of said one or more interconnecting devices has said disconnection release function;

a diagnosis module operable for sequentially controlling each of said interconnecting devices in said disconnected communication path having said disconnection release function to acquire communication statuses of said interconnecting devices, and for diagnosing a probable location of trouble in said interconnecting devices or said transmission media; and a notifying module operable for notifying that said interconnecting devices or said transmission media have trouble based upon the probable location of trouble diagnosed for said interconnecting devices or said transmission media by said diagnosis module.

* * * * *